US008252412B2

(12) United States Patent
Purdy et al.

(10) Patent No.: US 8,252,412 B2
(45) Date of Patent: Aug. 28, 2012

(54) ANGLE SWITCHABLE CRYSTALLINE COLLOIDAL ARRAY FILMS

(75) Inventors: Sean Purdy, Cincinnati, OH (US); Calum H. Munro, Wexford, PA (US); Xiangling Xu, Pittsburgh, PA (US)

(73) Assignee: PPG Industries Ohio, Inc, Cleveland, OH (US)

( * ) Notice: Subject to any disclaimer, the term of this patent is extended or adjusted under 35 U.S.C. 154(b) by 491 days.

(21) Appl. No.: 12/485,263

(22) Filed: Jun. 16, 2009

(65) Prior Publication Data
US 2010/0315703 A1 Dec. 16, 2010

(51) Int. Cl.
*B32B 3/10* (2006.01)
*B32B 33/00* (2006.01)
*B41M 3/14* (2006.01)
*G02B 5/02* (2006.01)

(52) U.S. Cl. ............ 428/323; 428/327; 428/916; 427/7; 359/588

(58) Field of Classification Search ........................ None
See application file for complete search history.

(56) References Cited

U.S. PATENT DOCUMENTS

| | | |
|---|---|---|
| 5,122,905 A | 6/1992 | Wheatley et al. |
| 5,266,238 A | 11/1993 | Haacke |
| 5,281,370 A | 1/1994 | Asher et al. |
| 5,330,685 A | 7/1994 | Panzer |
| 5,527,386 A | 6/1996 | Statz |
| 5,711,884 A | 1/1998 | Asher et al. |
| 5,783,120 A | 7/1998 | Ouderkirk et al. |
| 5,824,733 A | 10/1998 | Dobert et al. |
| 5,854,078 A | 12/1998 | Asher et al. |
| 5,932,309 A | 8/1999 | Smith et al. |
| 6,165,389 A | 12/2000 | Asher |
| 6,187,599 B1 | 2/2001 | Asher et al. |
| 6,299,979 B1 | 10/2001 | Neubauer et al. |
| 6,337,131 B1 | 1/2002 | Rupaner et al. |
| 6,753,191 B2 | 6/2004 | Asher et al. |
| 6,782,115 B2 | 8/2004 | Decker et al. |
| 6,894,086 B2 | 5/2005 | Munro et al. |
| 7,008,567 B2 | 3/2006 | Foulger et al. |
| 2002/0143073 A1 | 10/2002 | Jiang et al. |

(Continued)

FOREIGN PATENT DOCUMENTS
WO 2004063432 A1 7/2004
(Continued)

OTHER PUBLICATIONS

Endo, Tatsuro et al., "Colorimetric detection of volatile organic compounds using a colloidal crystal-based chemical sensor for environmental applications," Sensors and Actuators B, 2007, pp. 589-595, vol. 125, Elsevier B.V.

(Continued)

*Primary Examiner* — Ramsey Zacharia
(74) *Attorney, Agent, or Firm* — Julie W. Meder; Diane R. Meyers

(57) ABSTRACT

A radiation diffractive film is disclosed, which includes a viewing surface, with at least a portion of the viewing surface residing in a viewing plane. The film comprises an ordered periodic array of particles received in a matrix material, the array of particles having a crystalline structure, wherein the crystalline structure defines (i) a plurality of first crystal planes of the particles that diffract infrared radiation and (ii) a plurality of second crystal planes of the particles that diffract visible radiation.

23 Claims, 5 Drawing Sheets

U.S. PATENT DOCUMENTS

| | | | |
|---|---|---|---|
| 2004/0131799 | A1 | 7/2004 | Arsenault et al. |
| 2004/0253443 | A1 | 12/2004 | Anselmann et al. |
| 2005/0228072 | A1 | 10/2005 | Winkler et al. |
| 2006/0137601 | A1 | 6/2006 | Miguez et al. |
| 2006/0191442 | A1 | 8/2006 | He et al. |
| 2006/0235086 | A1 | 10/2006 | Maskaly et al. |
| 2006/0254315 | A1 | 11/2006 | Winkler et al. |
| 2007/0100026 | A1 | 5/2007 | Munro et al. |
| 2007/0165903 | A1 | 7/2007 | Munro et al. |
| 2009/0038512 | A1 | 2/2009 | Xu et al. |
| 2009/0155545 | A1 | 6/2009 | Purdy et al. |

FOREIGN PATENT DOCUMENTS

| | | | |
|---|---|---|---|
| WO | WO 2008017869 A1 | * | 2/2008 |

OTHER PUBLICATIONS

Nagao, Daisuke et al., "Preparation of highly monodisperse poly(methyl methacrylate) particles incorporating fluorescent rhodamine 6G for colloidal crystals," Journal of Colloid and Interface Science, 2006, pp. 232-237, vol. 298, Elsevier Inc.

Fudouzi, Hiroshi et al., "Colloidal Crystals with Tunable Colors and Their Use as Photonic Papers," Langmuir, 2003, pp. 9653-9660, vol. 19, American Chemical Society, USA.

Rao, A. Venkateswara et al., "Comparative studies of the physical and hydrophobic properties of TEOS based silica aerogels using different co-precursors," Science and Technology of Advanced Materials, 2003, pp. 509-515, vol. 4.

Hotta, Yuji, "Coated polystyrene particles as templates for ordered macroporous silica structures with controlled wall thickness," J. Mater. Chem., 2003, pp. 496-501, vol. 13.

Xu, Xiangling et al., "Synthesis and Utilization of Monodisperse Superparamagnetic Colloidal Particles for Magnetically Controllable Photonic Crystals," Chem. Mater., 2002, pp. 1249-1256, vol. 14, No. 3, American Chemical Society, USA.

Xu, Xiangling et al., "Mesoscopic Monodisperse Ferromagnetic Colloids Enable Magnetically Controlled Photonic Crystals," J. Am. Chem. Soc., 2002, pp. 13864-13868, vol. 124, American Chemical Society, USA.

Zeng, Fang et al., "Urea sensing materials via solidified crystalline colloidal arrays," Sensors and Actuators B, 2002, pp. 273-276, vol. 81, Elsevier Science B.V.

Zeng, Fang et al., "Preparation and dynamic viscoelastic properties of strengthened solidified colloidal crystals," Reactive & Functional Polymers, 2002, pp. 39-44, vol. 53, Elsevier Science B.V.

Xu, Xiangling et al., "Superparamagnetic Photonic Crystals," Advanced Materials, Nov. 16, 2001, pp. 1681-1684, vol. 13, No. 22, Wiley-VCH Verlag GmbH, Weinheim, Germany.

Jethmalani, Jagdish M. et al., "Diffraction of Visible Light by Ordered Monodisperse Silica-Poly(methyl acrylate) Composite Films," Chem. Mater., 1996, pp. 2138-2146, vol. 8, American Chemical Society, USA.

Pfaff et al., "Angle-Dependent Optical Effects Deriving from Submicron Structures of Films and Pigments," Chemical Review 1999, Mar. 15, 1999, pp. 1963-1981, vol. 99, American Chemical Society.

Velev, O. D. et al., "Porous silica via colloidal crystallization," Nature, Oct. 2, 1997, pp. 447-448, vol. 389, Macmillan Publishers Ltd.

Sperling, L.H., et al., "Interpenetrating Polymer Networks," pp. 427-431.

* cited by examiner

ANGLE SWITCHABLE CRYSTALLINE COLLOIDAL ARRAY FILMS

FIELD OF THE INVENTION

This invention relates to radiation diffractive film materials, more particularly, to periodic arrays of particles held in a matrix composition that diffract visible and infrared radiation.

BACKGROUND OF THE INVENTION

Radiation diffractive materials based on crystalline colloidal arrays have been used for a variety of purposes. A crystalline colloidal array (CCA) is a three-dimensional ordered array of mono-dispersed colloidal particles. The particles are typically composed of a polymer, such as polystyrene. These colloidal dispersions of particles can self-assemble into ordered arrays (crystalline structures) having lattice spacings that are comparable to the wavelength of ultraviolet, visible, or infrared radiation. The crystalline structures have been used for filtering narrow bands of selective wavelengths from a broad spectrum of incident radiation, while permitting the transmission of adjacent wavelengths of radiation. Alternatively, CCAs are fabricated to diffract radiation for use as colorants, markers, optical switches, optical limiters, and sensors.

Many of these devices have been created by dispersing particles in a liquid medium, whereby the particles self-assemble into an ordered array. The positions of the particles in the array may be fixed by mutual polymerization of the particles or by introducing a solvent that swells and locks the particles together.

Other CCAs are produced from a dispersion of similarly charged mono-dispersed particles in a carrier. The dispersion is applied to a substrate, and the carrier is evaporated to yield an ordered periodic array of particles. The array is fixed in place by coating the array with a curable polymer, such as an acrylic polymer, polyurethane, alkyd polymer, polyester, siloxane-contained polymer, polysulfide, or epoxy-containing polymer. Methods for producing such CCAs are disclosed in U.S. Pat. No. 6,894,086, incorporated herein by reference. Alternatively, the particles may have a core-shell structure where the core is produced from materials such as those described above for unitary particles and the shell is produced from the same polymers as the core material with the polymer of the particle shell different from the core material for a particular array of the core-shell particles. Such core-shell particles and methods of their production are disclosed, for example, in U.S. Patent Application Publication No. 2007/0100026, incorporated herein by reference.

In these arrays of unitary particles or core-shell particles, the structures diffract radiation according to Bragg's law, wherein the radiation meeting the Bragg conditions is reflected while adjacent spectral regions that do not meet the Bragg conditions are transmitted through the device. The wavelength of reflected radiation is in part determined by the effective refractive index of the array and the antiparticle spacing within the array.

SUMMARY OF THE INVENTION

The present invention includes a radiation diffractive film having a viewing surface, with at least a portion of the viewing surface residing in a viewing plane. The film comprises an ordered periodic array of particles received in a matrix material, the array of particles having a crystalline structure, wherein the crystalline structure defines (i) a plurality of first crystal planes of the particles that diffract infrared radiation and (ii) a plurality of second crystal planes of the particles that diffract visible radiation.

Also included in the present invention is a method of producing an optically variable anti-counterfeiting device comprising producing a dispersion of mono-dispersed particles; applying the dispersion of particles onto a substrate so that the particles self-align into an ordered periodic array that diffracts radiation; coating the array of particles with a matrix composition; and fixing the coated array of particles to produce a film comprising a crystalline structure, wherein the particles are sized such that the crystalline structure defines (i) a plurality of first crystal planes of the particles that diffract infrared radiation and (ii) a plurality of second crystal planes of the particles that diffract visible radiation.

DETAILED DESCRIPTION OF THE INVENTION

Figure 1:
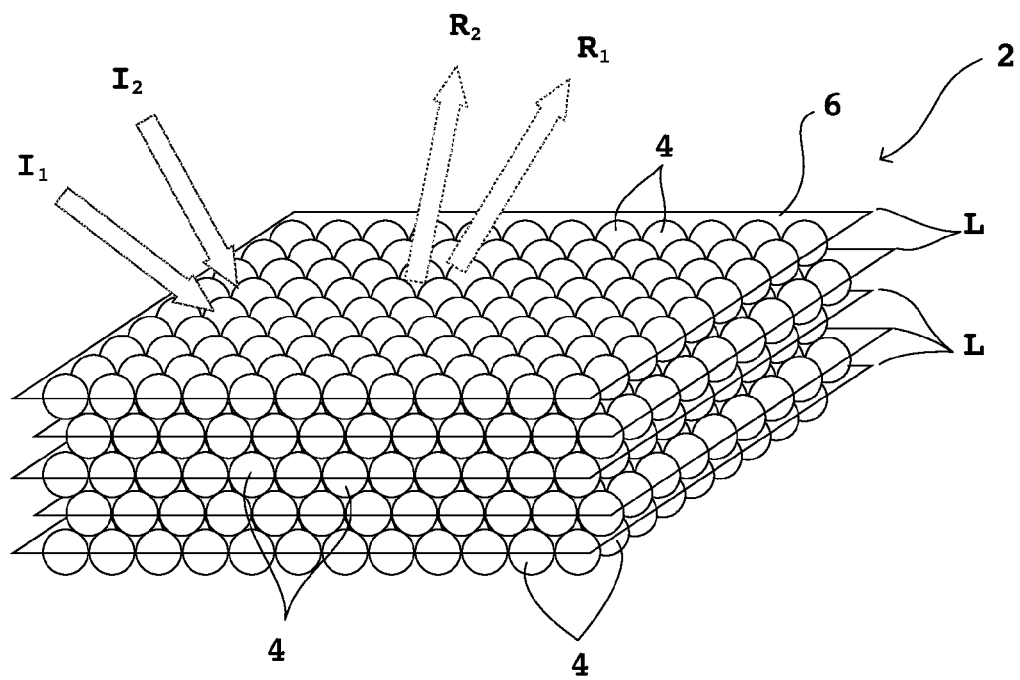
FIG. 1 is a perspective view of radiation diffraction material of the present invention showing a first set of planes of particles.

For purposes of the following detailed description, it is to be understood that the invention may assume various alternative variations and step sequences, except where expressly specified to the contrary. Moreover, other than in any operating examples, or where otherwise indicated, all numbers expressing, for example, quantities of ingredients used in the specification and claims are to be understood as being modified in all instances by the term "about". Accordingly, unless indicated to the contrary, the numerical parameters set forth in the following specification and attached claims are approximations that may vary depending upon the desired properties to be obtained by the present invention. At the very least, and not as an attempt to limit the application of the doctrine of equivalents to the scope of the claims, each numerical parameter should at least be construed in light of the number of reported significant digits and by applying ordinary rounding techniques. Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard variation found in their respective testing measurements.

Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

In this application, the use of the singular includes the plural and plural encompasses singular, unless specifically stated otherwise. In addition, in this application, the use of "or" means "and/or" unless specifically stated otherwise, even though "and/or" may be explicitly used in certain instances.

The term "polymer" is meant to include homopolymer, copolymer, and oligomer. The term "metal" includes metals, metal oxides, and metalloids. The term "infuse" and related terms (such as infusion) refer to penetration from a liquid phase.

The present invention includes radiation diffractive material, where the material diffracts radiation in the visible and/or non-visible electromagnetic spectrum and methods for making the same. The material includes an ordered periodic array of particles received in a polymeric matrix. The array includes a plurality of layers of the particles and satisfies Bragg's law of:

$$m\lambda = 2nd \sin \theta$$

where m is an integer, n is the effective refractive index of the array, d is the distance between the layers of particles, and $\lambda$ is the wavelength of radiation reflected from a plane of a layer of the particles at angle $\theta$. As used herein, "a" wavelength of diffracted radiation includes a band of the electromagnetic spectrum around that wavelength. For example, reference to a wavelength of 600 nanometers (nm) may include 595 to 605 nm. The reflected radiation may be in the visible spectrum or invisible spectrum (infrared or ultraviolet radiation). As used herein, when a periodic array of particles is said to Bragg diffract radiation or reflect radiation according to Bragg's law, it is meant that at least some incident radiation is diffracted by the crystalline structure of the array, thereby producing some reflected radiation according to Bragg's law.

The radiation diffractive material generally includes a periodic array of organic particles held in an organic matrix. Parallel layers or planes formed by the periodic array of particles interact with incident radiation in accordance with Bragg's law. The diffraction wavelength of the light at a given angle is proportional to the distance between the Bragg planes formed by the periodic array of particles, which is proportional to the particle diameter for close-packed spheres. The diffraction wavelength also depends on the effective refractive index of the imaging member. The effective refractive index of the radiation diffractive material is closely approximated as a volume average of the refractive index of the materials of the radiation diffractive material, including the particles and the matrix material surrounding the particles. The intensity of the diffracted radiation is dependent on the refractive index variation within the radiation diffractive material as dictated by the arrangement of the particles and the surrounding matrix. The number of layers that are formed by the array of particles and the matrix and the refractive index contrast between alternating layers can also influence the diffraction intensity. More particle layers produce greater diffraction intensity. Higher refractive index contrast between alternating layers also produces greater diffraction intensity. Higher refractive index contrast between alternating layers can be achieved by using particles and matrix having a relative large difference in their respective indices of refraction. Alternatively, directionally expanding the particles and/or the matrix can alter the layered structure and increase the refractive index contrast between the layers.

The radiation diffractive material of the present invention includes arrays of particles fixed in a matrix as described above and is provided as a film that may or may not be self-supported. The film includes a viewing surface that at least partially resides in a plane and is exposed during use, such as when applied to an article. In FIGS. 1-5, only the particles of the film are shown in order to describe the relationships between the particles. However, it should be understood that the arrays of particles of the present invention are fixed in a matrix composition as described above. For example, the view of the surface includes the matrix composition, which is not shown in the drawings. Accordingly, references to the array of particles herein are applicable to the film of the present invention comprising the array and matrix composition.

Figure 2:
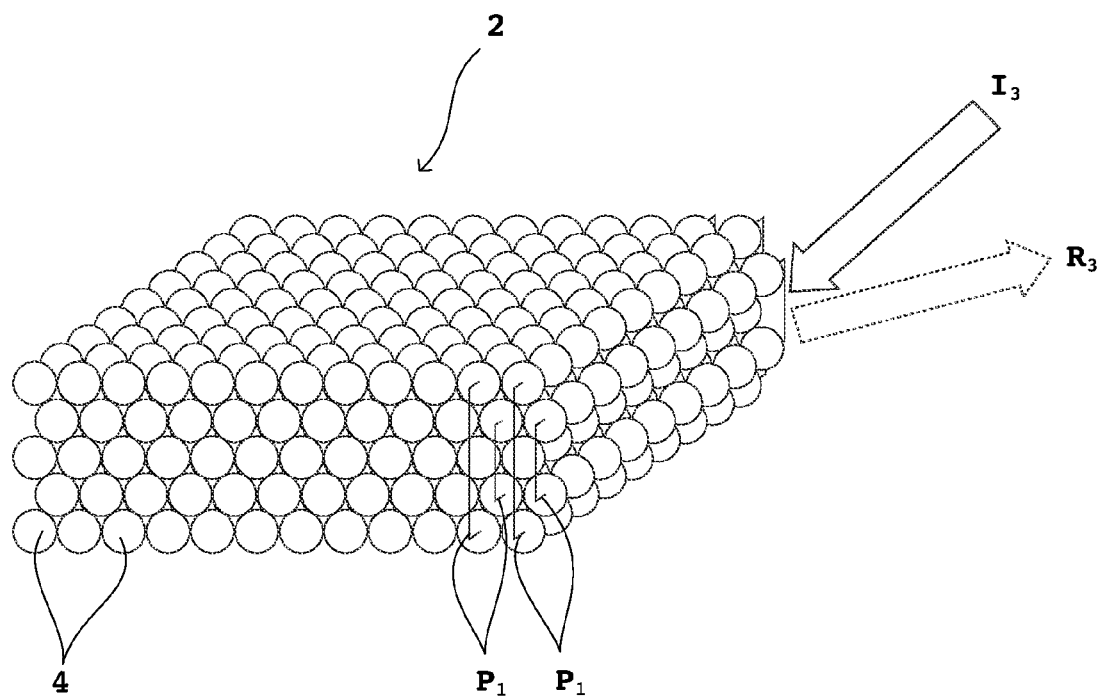
FIG. 2 is another view of the radiation diffractive material shown in FIG. 1, showing another set of planes of particles.

Referring to FIGS. 1 and 2, an array 2 of the present invention includes a plurality of particles 4 assembled in a periodic arrangement referred to herein as a crystalline structure. The crystalline structure includes a plurality of first crystal planes L of particles 4 that are generally parallel to the plane of the viewing surface 6. The first crystal planes L are the 111 place of a face center cubic (FCC) crystal. (As noted above, viewing surface 6 also includes the matrix composition, not shown). The first crystal planes L diffract incident radiation (for example, incident rays 11 and 12) according to Bragg's law, with reflected radiation produced as indicated by reflected rays $R_1$ and $R_2$. As shown in FIG. 1, the diffracted radiation is goniochromatic, meaning the wavelength of diffracted radiation varies with the vertical viewing angle. The vertical viewing angle is the angle that incident light makes with the plane of the viewing surface 6. FIG. 1 shows two incident rays of radiation $I_1$ and $I_2$ striking the array 2 at two different angles, with the angle that incident ray $I_1$ makes with the viewing surface 6 being smaller than the angle that incident ray $I_2$ makes with the viewing surface 6. The corresponding reflected radiation (ray $R_1$) that reflects from the first crystal planes L according to Bragg's law from incident radiation $I_1$ is at a smaller angle to the viewing surface 6 than is the reflected ray $R_2$ produced from incident radiation $I_2$.

For generally spherical particles 4, the centers of the particles 4 define the parallel first crystal planes L. In one embodiment of the invention, the particles 4 are sized such that the first crystal planes L diffract infrared radiation according to Bragg's law, such as at wavelengths of 800-1100 nm. For example, polymeric (e.g. polystyrene) spheres sized approximately 320 to 430 nm may be used to produce the array 2. The particles 4 may have other shapes, such as ovoid, but are generally uniformally shaped within the array 2 so that the distances between parallel planes of particles is generally uniform whereby the planes L meet the Bragg conditions for diffraction of radiation.

As indicated in FIG. 2, the crystalline structure of array 2 in the film also defines a plurality of generally parallel second crystal planes $P_1$ (such as the 220 planes in an FCC crystal) through the centers of the particles 4, with the second crystal planes $P_1$ positioned perpendicular to the viewing surface 6 and the first crystal planes L. Incident radiation striking the array 2 at low angles of incident radiation, as indicated by incident ray $I_3$, is Bragg diffracted. Low angle incident radiation is likewise reflected at low angles from planes $P_1$ as indicated by reflected ray $R_3$. By low angle of incidence and reflected radiation, it is meant less than about 30 degrees from the viewing surface 6.

According to one embodiment, the particles 4 are sized so that the wavelength of radiation reflected from the first crystal planes L is in the infrared portion of the electromagnetic spectrum, while the wavelength of radiation reflected from the second crystal planes P is in the visible portion of the electromagnetic spectrum. The wavelengths of reflected radiation are controlled at least in part by the respective distances between the sets of planes L and P. According to Bragg's law, a larger interplanar distance (corresponding to the variable "d") results in longer wavelength of reflected radiation, e.g., in the infrared portion of the electromagnetic spectrum. The dimensions of the particles 4 may be controlled to select the wavelength of radiation reflected from the first crystal planes L and the wavelengths of radiation reflected from the second crystal planes P, with the wavelength of radiation reflected from the second crystal planes P being less than the wavelength of radiation reflected from the first crystal planes L. Referring to FIGS. 1 and 2 by way of example, the wavelength of radiation $R_3$ is less than the wavelengths of radiation $R_1$ and $R_2$.

Figure 3:
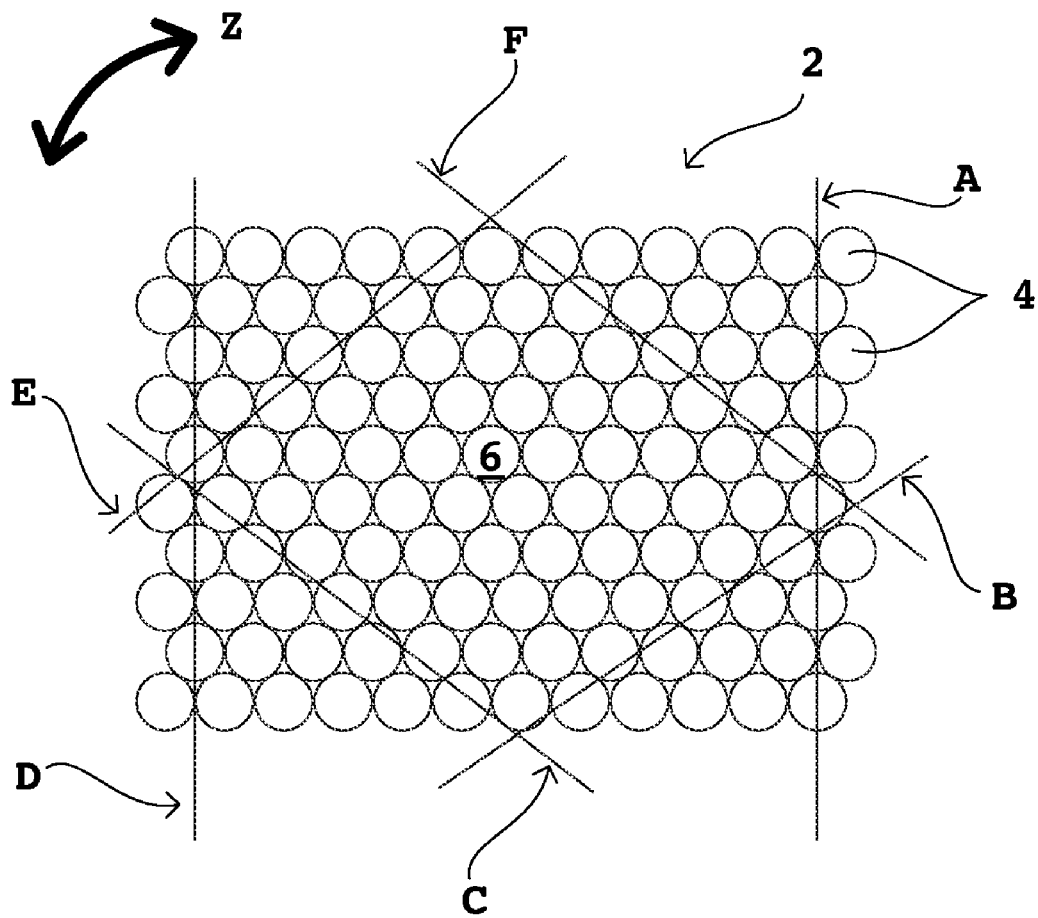
FIG. 3 is a plan view of the radiation diffractive material shown in FIG. 1, showing additional sets of planes of particles.

As shown in FIG. 3, the array 2 can be viewed from a plurality of directions. By reference to lines A-F, a plurality of sets of second crystal planes P are positioned in the array 2 with respect to the viewing surface 6. For example, incident radiation striking the array 2 in the direction of line A towards line D is Bragg diffracted and reflected from the second crystal planes P between lines A and D. Incident radiation striking the array 2 in the direction of line B towards line E is Bragg diffracted and reflected from the second crystal planes P between lines B and E. Another set of second crystal planes P between lines C and F likewise diffracts radiation incident from the direction of line C towards line F. The same phenomenon occurs for second crystal planes P between lines A and D when viewed in the direction of line D towards line A, for second crystal planes P between lines B and E when viewed in the direction of line B towards line E and second crystal planes P between lines C and F when viewed in the direction of line F towards line C. Each of these viewing directions and sets of second crystal planes P are separated by about 60 degrees from each other. The arrangement of six sets of second crystal planes P is a feature of the crystalline structure of the array 2. Consequently, low angle Bragg diffraction occurs approximately at 60 degree intervals in the array 2. When the planes P diffract visible radiation, this is detected as reflected light appearing at 60 degree intervals, or as being visible for 30 degrees and invisible for 30 degrees. In this manner, when the array 2 is rotated, as indicated by double arrow Z, about an axis perpendicular to the plane of the viewing surface 6 (or the user's view moves relative thereto) visible radiation appears to be turned on and turned off, with every 30 degrees of rotation.

The visible diffraction of radiation may be the appearance of a color shift or may be in the form of an image. For example, the visible radiation reflected by the second crystal planes P may be in the green visible spectrum so that when the second crystal planes P are aligned with a user's field of vision and the film is rotated relative to the user in the plane of the film, the green color disappears and the film appears dark, i.e., no visible radiation is reflected. In another embodiment, reflected visible radiation from the second crystal planes P may be in the form of an image that disappears upon rotation of the film. Methods for providing an image in the array are described below.

Figure 4:
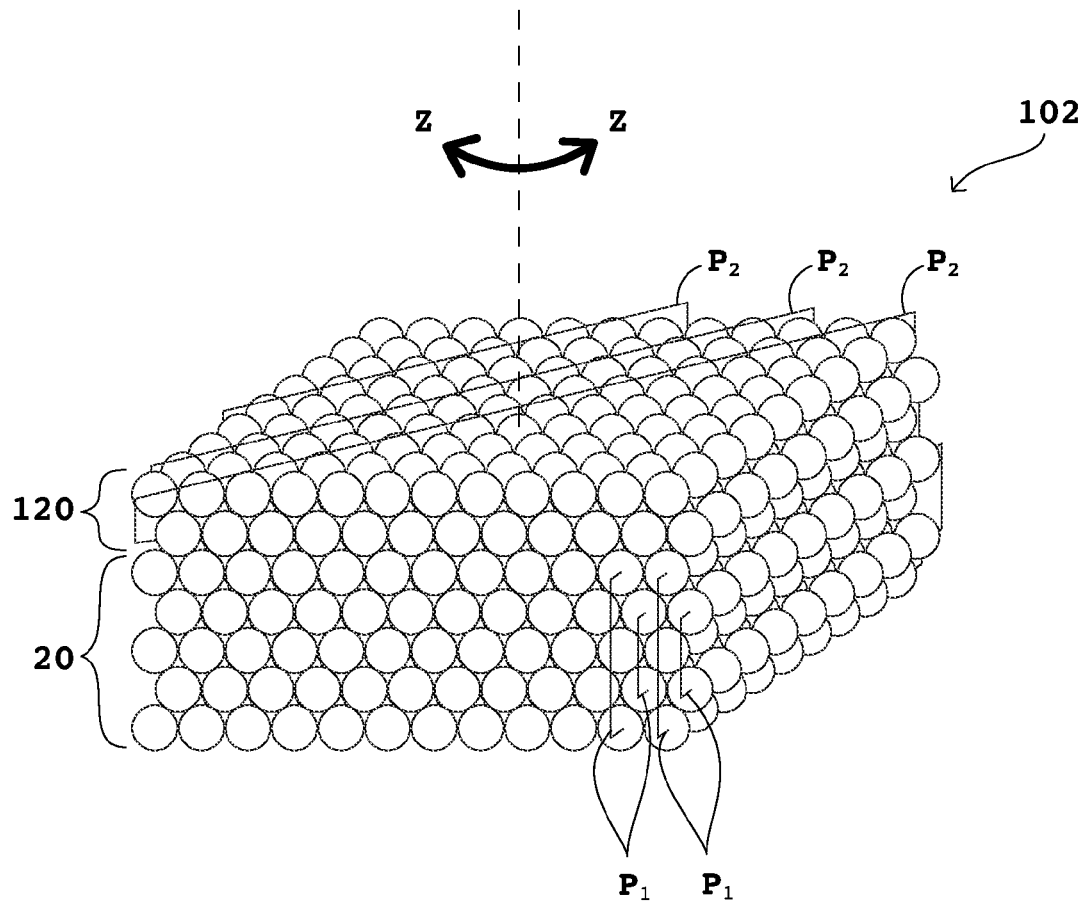
FIG. 4 is another embodiment of the invention including two films of the radiation diffractive material of the present invention.
Figure 5:
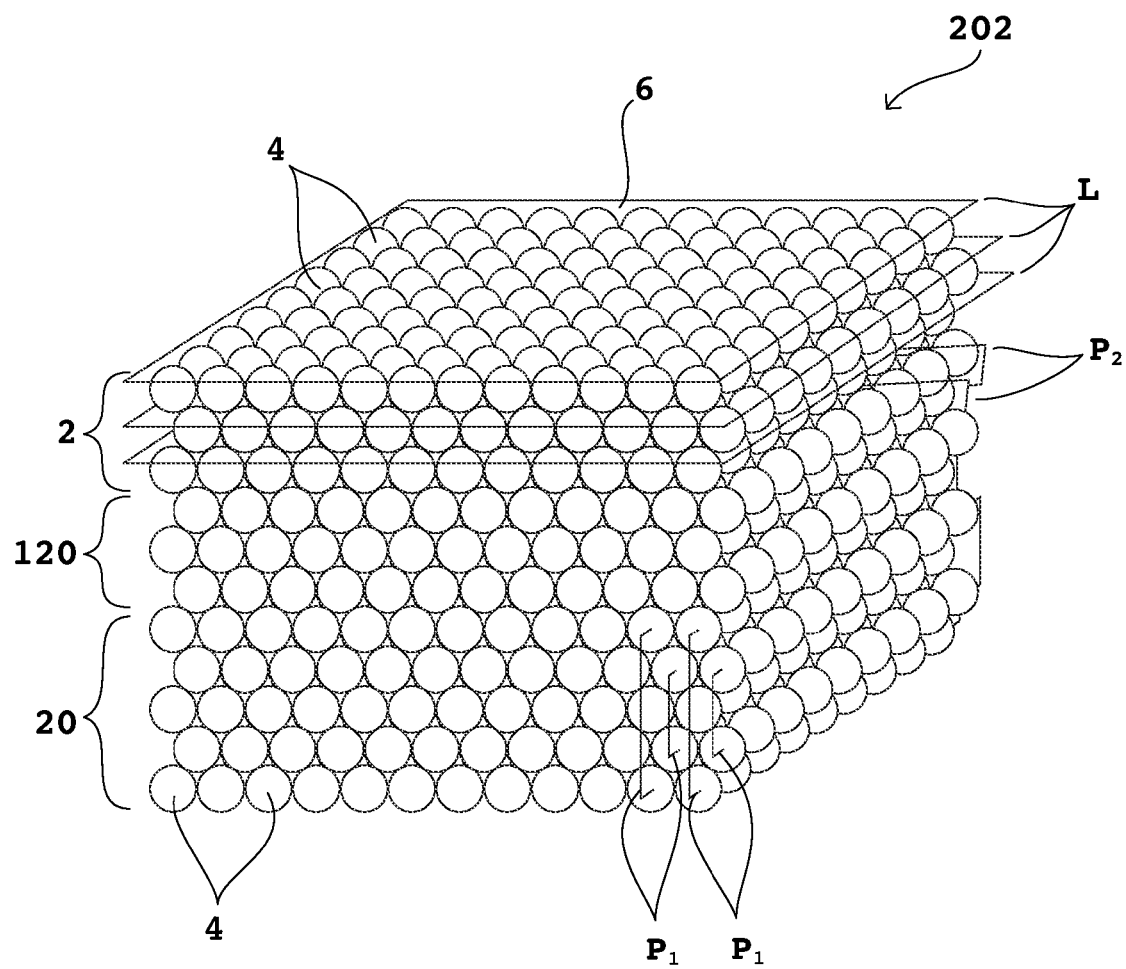
FIG. 5 is another embodiment of the invention including three films of the radiation diffractive material of the present invention.

In another embodiment, the present invention includes a multi-layered film 102 including at least two arrays 20,120 (FIGS. 4 and 5). Arrays 20 and 120 diffract radiation at least in set of respective second crystal planes $P_1$ and $P_2$ The second crystal planes $P_1$ and $P_2$ may be offset from each other as shown in FIG. 4 such that upon rotation of the multi-layered film 102 as described above, visible radiation is reflected from second crystal planes $P_1$ and $P_2$ in an alternating fashion. The wavelengths of diffracted radiation reflected from second crystal planes $P_1$ and $P_2$ may be the same or different from each other. For example, second crystal planes $P_1$ in array 20 may reflect a solid color (e.g., green), while second crystal planes $P_2$ in array 120 may reflect an image. Rotation of film 102 may reflect in alternating reflection from second crystal planes $P_1$ and $P_2$, such as green color and an image appearing in an alternating fashion. FIG. 5 shows a multi-layered film 202 having three arrays 2, 20, and 120. Arrays 2, 20, and 120 may be produced in a variety of configurations. For example, array 2 may reflect visible radiation from first crystal planes L, array 20 may reflect visible radiation (a color or an image) from second crystal planes $P_1$, and array 120 may reflect visible radiation (a color or an image) from second crystal planes $P_2$. Arrays 20 and 120 would reflect infrared radiation from their crystal planes L. The relative positions of arrays 20 and 120 (FIGS. 4 and 5) may be adjusted so that the reflections from second crystal planes $P_1$ and $P_2$ are out of phase with each other or are in the same directions or overlap each other. In addition, a plurality of arrays may be included in a multi-layered film to achieve a desired color effect, image effect, infrared reflection, or combinations thereof. It should be appreciated that many variations of multi-layered films may be produced according to the present invention.

Particles

Suitable materials for the particles include polystyrene, polyurethane, acrylic polymers, alkyd polymers, polyester, siloxane-containing polymers, polysulfides, epoxy-containing polymers, and polymers derived from epoxy-containing polymers, as well as inorganic materials, such as metal oxides (e.g., alumina, silica, or titanium dioxide) or semiconductors (e.g., cadmium selenide) or composites of these materials.

In one embodiment, the particles have a generally unitary structure. As used herein, "unitary structure" refers to a feature of the particles each having a generally uniform structure without component structures, although the composition thereof may vary through the unitary particles, such as may occur upon diffusion of solvent or matrix therein. Alternatively, the particles may have a core-shell structure where the core is produced from a different composition from the shell composition. Suitable compositions for the particle core include organic polymers such as polystyrene, polyurethane, acrylic polymers, alkyd polymers, polyester, siloxane-containing polymers, polysulfides, epoxy-containing polymers, or polymers derived from epoxy-containing polymers, as well as inorganic materials, such as metal oxides (e.g., alumina, silica, or titanium dioxide) or semiconductors (e.g., cadmium selenide). Suitable compositions for the shell include organic polymers (e.g., polystyrene, polyurethane, acrylic polymers, alkyd polymers, polyester, siloxane-containing polymers, polysulfides, epoxy-containing polymers, or polymers derived from epoxy-containing polymers), with the composition of the particle shell differing from the matrix material for a particular array of the core-shell particles. The shell material may be non-film-forming, meaning that the shell material remains in position surrounding each particle core without forming a film of the shell material, so that the core-shell particles remain as discrete particles within the polymeric matrix. As such, the array includes at least three general regions; namely, the matrix, the particle shell, and the particle core. Alternatively, the shell material may be film-forming, such that the shell material forms a film around the cores. The core material and the shell material have different indices of refraction. In addition, the refractive index of the shell may vary as a function of the shell thickness in the form of a gradient of refractive index through the shell thickness. The refractive index gradient may be a result of a gradient in the composition of the shell material through the shell thickness.

The shell material may be non-film-forming, whereby the shell material remains in position surrounding each particle core without forming a film of the shell material so that the core-shell particles remain as discrete particles within the polymeric matrix and the second particles are infused into the shells. Alternatively, the shell material may be film-forming such that the shells of the core-shell particles form a film and function as a matrix material surrounding the remaining cores. For particles that are generally spherical, the diameter of the core may constitute 85 to 95% of the total particle diameter or 90% of the total particle diameter with the shell constituting the balance of the particle diameter and having a radial thickness dimension.

In one embodiment, the particle cores are produced via emulsion polymerization of core-precursor monomers in the presence of a surfactant, yielding a dispersion of the cores. Suitable surfactants for dispersion of organic polymer particles include, but are not limited to, sodium styrene sulfonate, sodium 1-allyloxy-2-hydroxypropyl sulfonate (commercially available as Sipomer COPS-I from Rhodia Corporation), acrylamide propyl sulfonate, and sodium allyl sulfonate. Particularly useful surfactants are those that are minimally soluble in the dispersing fluid (e.g., water) of the particle dispersion. Shell monomers are added to the core particle dispersion, along with a surfactant (as described above), such that the shell monomers polymerize onto the core particles. The core-shell particles are purified from the dispersion by techniques such as ultra-filtration, dialysis, or ion-exchange to remove undesired materials, such as unreacted monomer, small polymers, water, initiator, surfactant, unbound salt, and grit (agglomerated particles) to produce a monodispersion of charged core-shell particles. Ultra-filtration is particularly suitable for purifying charged particles. When the particles are in dispersion with other materials, such as salts or by-products, the repelling forces of the charged particles can be mitigated; therefore, the particle dispersion is purified to essentially contain only the charged particles, which then readily repel each other and form an ordered array on a substrate as described below.

In another embodiment of the invention, unitary-structured particles are produced by dispersing monomers with initiators in solution to produce unitary particles as described above with regard to preparing the cores of core-shell particles. A dispersion of the unitary particles is purified as described above to produce a dispersion of only the charged unitary particles, which then form an ordered array on a substrate as described below.

Array of Particles

Upon removal of the excess raw material, by-products, solvent, and the like, electrostatic repulsion of the charged particles causes the particles to self-assemble into an ordered array. The purified dispersion of particles is applied to a substrate and dried. The dispersion of the particles applied to the substrate may contain 10-70 vol. % of charged particles or 30-65 vol. % of charged particles. The dispersion can be applied to the substrate by dipping, spraying, brushing, roll-coating, curtain coating, flow-coating, or die-coating to a desired thickness. The wet coating may have a thickness of 4-50 microns, such as 20 microns. Upon drying, the material contains essentially only the particles that have self-assembled in a Bragg array and diffract radiation accordingly.

Matrix

The dried array of particles (core-shell or unitary) on a substrate is fixed in a matrix by coating the array of particles with a fluid curable matrix composition that includes monomers or other polymer precursor materials, as disclosed in U.S. Pat. No. 6,894,086 (incorporated herein by reference) to interpenetrate the array of particles with the curable matrix composition. The curable matrix composition material may be coated onto the dried array of particles via dipping, spraying, brushing, roll-coating, gravure coating, curtain coating, flow coating, slot-die coating, or ink-jet coating. By coating, it is meant that the curable matrix composition covers at least substantially the entirety of the array and at least in part fills the interstitial spaces between the particles.

The matrix material may be an organic polymer such as polystyrene, polyurethane, acrylic polymers, alkyd polymers, polyester, siloxane-containing polymers, epoxy-containing polymers, and/or polymers derived from an epoxy-containing polymer. In one embodiment, the matrix material is a water-soluble or hydrophilic acrylic polymer. Suitable monomers for producing a water soluble or hydrophilic matrix include, but are not limited to, ethoxylated trimethylolpropane triacrylate, polyethylene glycol, (600) diacrylate, polyethylene glycol, (400) diacrylate, polyethylene glycol, (200) diacrylate, and acrylic acid, followed by curing of the matrix composition to yield an organic matrix. Other suitable monomers for producing a water soluble or hydrophilic polymer matrix may include polyethylene glycol (1000) diacrylate, methoxy polyethylene glycol (350) monoacrylate, methoxy polyethylene glycol (350) monomethacrylate, methoxy polyethylene glycol (550) monomethacrylate, methoxy polyethylene glycol (550) monoacrylate, ethoxylated$_{30}$ bisphenol A diacrylate, 2-(2-ethoxyethoxy)ethyl acrylate, acrylamide, hydroxyethyl acrylate, hydroxypropyl acrylate, polyethylene glycol (600) dimethacrylate, polyethylene glycol (400) dimethacrylate, ethoxylated$_{30}$ bisphenol A dimethacrylate, hydroxyethyl methacrylate, and hydroxypropyl methacrylate.

As detailed below, the array of particles received in a matrix may be produced on a substrate that functions as a temporary support or on a substrate that is a desired end-use for the radiation diffraction material. By temporary support, it is meant that the substrate is used to support production of the radiation diffraction material of the present invention, which is subsequently removed therefrom in self-supporting form such as, for example, a self-supporting film or comminuted particulate matter. A film of the radiation diffraction material or particulates of the radiation diffraction material may then be applied to another support or added to a composition (such as a coating composition) for its ultimate end-use. The end-use and final form of the radiation diffraction material is not limited to those described herein.

For multi-layered films (e.g., films 102 and 202), separate films containing the respective arrays (e.g., arrays 20 and 120) fixed in respective matrixes are produced and laminated together by thermally bonding or affixing films together with an adhesive. The multi-layered films may or may not be self-supported.

In one embodiment, the radiation diffraction material of the present invention is non-gelatinous and substantially solid. By non-gelatinous, it is meant that the radiation diffraction material does not contain a fluidizing material, such as water, and is not a hydrogel, nor produced from a hydrogel. In certain embodiments, the radiation diffraction material of the present invention substantially only includes the particles and the matrix with some possible residual solvent and, thus, is substantially solid. The volumetric ratio of the particles to the matrix in the radiation diffraction material is typically about 25:75 to about 80:20.

An image may be produced in the radiation diffraction material using actinic radiation as described below. In one embodiment, an array of particles is received within a curable matrix, such as by pre-arranging similarly charged particles in a periodic array on a substrate and coating the array of particles with a curable matrix composition. The periodic array of particles may be coated by applying a curable matrix composition onto the array by spraying, brushing, roll coating, gravure coating, curtain coating, flow coating, slot-die coating, or ink-jet coating (as described in U.S. Pat. No. 6,894,086) or by embedding the array of particles into a coating composition on a substrate.

A first portion of the matrix coated array is exposed to actinic radiation to cure the matrix composition in the exposed portion. The remaining portion of the array that was not exposed to actinic radiation is treated to alter the inter-particle spacing of the particles in the remaining portion of the array. After alteration of the inter-particle spacing of the particles, the array is exposed to actinic radiation to cure the remaining portion of the matrix. The portion of the radiation diffraction material that was first exposed diffracts radiation at a different wavelength band than the remaining portion. For example, the first portion may be exposed to actinic radiation by use of a mask or by focused laser radiation. In one embodiment, when the matrix composition is curable with ultraviolet (UV) radiation, such as an acrylate-based composition, the actinic radiation used to cure the matrix composition includes UV radiation.

In another embodiment, a first portion of the matrix coated array is exposed to actinic radiation to cure the curable matrix in the exposed portion. The remaining unexposed portion is altered in a manner that disturbs the array and prevents the remaining portion from diffracting radiation. An ordered periodic array of particles may be disturbed by various techniques including, for example, by applying a solvent to the array that at least partially dissolves the particles, overheating the unexposed portion to destroy the particles, or by mechanically disrupting the particles.

Substrate

The substrate may be a flexible material, such as metal sheet or foil (e.g., aluminum foil), paper or a film (or sheet) of polyester or polyethylene terephthalate (PET), or an inflexible material, such as glass or plastic. By "flexible" it is meant that the substrate can undergo mechanical stresses, such as bending, stretching, compression, and the like, without significant irreversible change. One suitable substrate is a microporous sheet. Some examples of microporous sheets are disclosed in U.S. Pat. Nos. 4,833,172; 4,861,644; and 6,114,023, which are incorporated herein by reference. Commercially available microporous sheets are sold under the designation Teslin® by PPG Industries, Inc. Other suitable flexible substrates include natural leather, synthetic leather, finished natural leather, finished synthetic leather, suede, vinyl nylon, ethylene vinyl acetate foam (EVA foam), thermoplastic urethane (TPU), fluid-filled bladders, polyolefins and polyolefin blends, polyvinyl acetate and copolymers, polyvinyl chloride and copolymers, urethane elastomers, synthetic textiles, and natural textiles.

In certain embodiments, the flexible substrates are compressible substrates. "Compressible substrate" and like terms refer to substrates capable of undergoing a compressive deformation and returning to substantially the same shape once the compressive deformation has ceased. The term "compressive deformation" means a mechanical stress that reduces the volume at least temporarily of a substrate in at least one direction. As noted above, the composite material of the present invention may be applied to a compressible substrate. "Compressible substrate" and like terms refer to a substrate capable of undergoing a compressive deformation and returning to substantially the same shape once the compressive deformation has ceased. The term "compressive deformation" and like terms mean a mechanical stress that reduces the volume at least temporarily of a substrate in at least one direction. A compressible substrate is one, for example, that has a compressive strain of 50% or greater, such as 70%, 75%, or 80% or greater. Particular examples of compressible substrates include those comprising foam and polymeric bladders filled with air, liquid, and/or plasma. "Foam" can be a polymeric or natural material comprising open cell foam and/or closed cell foam. "Open cell foam" means that the foam comprises a plurality of interconnected air chambers; "closed cell foam" means that the foam comprises discrete closed pores. Example foams include, but are not limited to, polystyrene foams, polyvinyl acetate and/or copolymers, polyvinyl chloride and/or copolymers, poly (meth)acrylimide foams, polyvinylchloride foams, polyurethane foams, thermoplastic urethane foams, and polyolefinic foams, and polyolefin blends. Polyolefinic foams include, but are not limited to, polypropylene foams, polyethylene foams, and ethylene vinyl acetate ("EVA") foams. "EVA foam" can comprise open cell foam, and/or closed cell foam. EVA foam can include flat sheets or slabs or molded EVA foams, such as shoe midsoles. Different types of EVA foam can have different types of surface porosity. Molded EVA foam can comprise a dense surface or "skin", whereas flat sheets or slabs can exhibit a porous surface.

Polyurethane substrates according to the present invention include aromatic, aliphatic, and hybrid (hybrid examples are silicone polyether or polyester urethane and silicone carbonate urethane) polyester or polyether based thermoplastic urethane. By "plastic" is meant any of the common thermoplastic or thermosetting synthetic materials, including thermoplastic olefins ("TPO") such as polyethylene and polypropylene and blends thereof, thermoplastic urethane, polycarbonate, sheet molding compound, reaction-injection molding compound, acrylonitrile-based materials, nylon, and the like. A particular plastic is TPO that comprises polypropylene and EPDM (ethylene propylene diene monomer).

The composite material may be applied to an article in various ways. In one embodiment, the composite material is produced on a substrate and is then removed from the substrate and comminuted into particulate form, such as in the form of flakes. The comminuted composite material may be incorporated as an additive in a coating composition for applying to an article. It may be beneficial to minimize the haze in a coating composition containing the comminuted composite material. Reduced haze may be achieved by reducing the difference in refractive index between the matrix and particles of the composite material. However, a reduction in the refractive index difference generally reduces the intensity of refracted radiation. Therefore, when minimal haze is desired and the refractive index difference is reduced, intensity may be maintained by increasing the thickness of the composite material, i.e., by increasing the quantity of layers of particles in the array, as compared to material in which the refractive indices of the matrix and particles are more distinct from each other.

In one embodiment, the coating composition comprises a "hard coat", such as an alkoxide. The alkoxide can be further mixed and/or reacted with other compounds and/or polymers known in the art. Particularly suitable are compositions comprising siloxanes formed from at least partially hydrolyzing an organoalkoxysilane, such as one within the formula above. Examples of suitable alkoxide-containing compounds and methods for making them are described in U.S. Pat. Nos. 6,355,189; 6,264,859; 6,469,119; 6,180,248; 5,916,686; 5,401,579; 4,799,963; 5,344,712; 4,731,264; 4,753,827; 4,754,012; 4,814,017; 5,115,023; 5,035,745; 5,231,156; 5,199,979; and 6,106,605, which are incorporated by reference herein.

In certain embodiments, the alkoxide comprises a combination of a glycidoxy[($C_1$-$C_3$)alkyl]tri($C_1$-$C_4$)alkoxysilane monomer and a tetra($C_1$-$C_6$)alkoxysilane monomer. Glycidoxy[($C_1$-$C_3$)alkyl]tri($C_1$-$C_4$)alkoxysilane monomers suitable for use in the coating compositions of the present invention include glycidoxymethyltriethoxysilane, α-glycidoxyethyltrimethoxysilane, α-glycidoxyethyl-triethoxysilane, β-glycidoxyethyltrimethoxysilane, β-glycidoxyethyltriethoxysilane, α-glycidoxy-propyltrimethoxysilane, α-glycidoxypropyltriethoxysilane, β-glycidoxypropyltrimethoxysilane, β-glycidoxypropyl-triethoxysilane, γ-glycidoxypropyltrimethoxysilane, hydrolysates thereof, and/or mixtures of such silane monomers. Suitable tetra($C_1$-$C_6$)alkoxysilanes that may be used in combination with the glycidoxy[($C_1$-$C_3$)alkyl]tri($C_1$-$C_4$)alkoxysilane in the coating compositions of the present invention include, for example, materials such as tetramethoxysilane, tetraethoxysilane, tetrapropoxysilane, tetrabutoxysilane, tetrapentyloxysilane, tetrahexyloxysilane, and mixtures thereof.

In certain embodiments, the glycidoxy[($C_1$-$C_3$)alkyl]tri($C_1$-$C_4$)alkoxysilane and tetra($C_1$-$C_6$)alkoxysilane monomers used in the coating compositions of the present invention are present in a weight ratio of glycidoxy[($C_1$-$C_3$)alkyl]tri($C_1$-$C_4$)alkoxysilane to tetra($C_1$-$C_6$)alkoxysilane of from 0.5:1 to 100:1, such as 0.75:1 to 50:1 and, in some cases, from 1:1 to 5:1. In certain embodiments, the alkoxide is at least partially hydrolyzed before it is combined with other components of the coating composition, such as polymer-enclosed color-imparting particles. Such a hydrolysis reaction is described in U.S. Pat. No. 6,355,189 at column 3, lines 7 to 28, the cited portion of which is incorporated by reference herein. In certain embodiments, water is provided in an amount necessary for the hydrolysis of the hydrolyzable alkoxide(s). For example, in certain embodiments, water is present in an amount of at least 1.5 moles of water per mole of hydrolyzable alkoxide. In certain embodiments, atmospheric moisture, if sufficient, can be adequate.

In certain embodiments, a catalyst is provided to catalyze the hydrolysis and condensation reaction. In certain embodiments, the catalyst is an acidic material and/or a material, different from the acidic material, which generates an acid upon exposure to actinic radiation. In certain embodiments, the acidic material is chosen from an organic acid, inorganic acid, or mixture thereof. Non-limiting examples of such materials include acetic, formic, glutaric, maleic, nitric, hydrochloric, phosphoric, hydrofluoric, sulfuric acid, or mixtures thereof.

Any material that generates an acid on exposure to actinic radiation can be used as a hydrolysis and condensation catalyst in the coating compositions of the present invention, such as a Lewis acid and/or a Bronsted acid. Non-limiting examples of acid generating compounds include onium salts and iodosyl salts, aromatic diazonium salts, metallocenium salts, o-nitrobenzaldehyde, the polyoxymethylene polymers described in U.S. Pat. No. 3,991,033, the o-nitrocarbinol esters described in U.S. Pat. No. 3,849,137, the o-nitrophenyl acetals, their polyesters, and end-capped derivatives described in U.S. Pat. No. 4,086,210, sulphonate esters, or aromatic alcohols containing a carbonyl group in a position alpha or beta to the sulphonate ester group, N-sulphonyloxy derivatives of an aromatic amide or imide, aromatic oxime sulphonates, quinone diazides, and resins containing benzoin groups in the chain, such as those described in U.S. Pat. No. 4,368,253. Examples of these radiation activated acid catalysts are also disclosed in U.S. Pat. No. 5,451,345.

In certain embodiments, the acid generating compound is a cationic photoinitiator, such as an onium salt. Non-limiting examples of such materials include diaryliodonium salts and triarylsulfonium salts, which are commercially available as SarCat® CD-1012 and CD-1011 from Sartomer Company. Other suitable onium salts are described in U.S. Pat. No. 5,639,802, column 8, line 59 to column 10, line 46. Examples of such onium salts include 4,4'-dimethyldiphenyliodonium tetrafluoroborate, phenyl-4-octyloxyphenyl phenyliodonium hexafluoroantimonate, dodecyldiphenyl iodonium hexafluoroantimonate, [4-[(2-tetradecanol)oxy]phenyl]phenyl iodonium hexafluoroantimonate, and mixtures thereof.

The amount of catalyst used in the coating compositions of the present invention can vary widely and depend on the particular materials used. Only the amount required to catalyze and/or to initiate the hydrolysis and condensation reaction is required, e.g., a catalyzing amount. In certain embodiments, the acidic material and/or acid generating material can be used in an amount from 0.01 to 5% by weight, based on the total weight of the composition.

The radiation diffraction material produced according to the invention may be used in marking devices, including documents of value, articles of manufacture and their packaging, and credentials documents, particularly of an art-counterfeiting device. Examples of documents of value include currency, credit cards, compliance certificates, collectors' items and trading cards, deeds, titles or registrations (e.g., automotive), compliance decals, tickets (e.g., travel, events or parking), tax stamps, coins, postage stamps, checks and money orders, stationary, lottery tickets, chips and/or tokens, controlled items (e.g., evidence), key cards, keys, tracing and tracking items, and as a portion of barcodes. Articles of manufacture or packaging of articles of manufacture may include aircraft parts, automotive parts such as vehicle identification numbers, pharmaceutical products and personal care products, recorded media, clothing and footwear, electronic devices, batteries, ophthalmic devices, alcohol, food items, printing inks and printing consumables, writing implements, luxury items such as luggage and handbags, sporting goods, software and software packaging, tamper seals, artwork (including original works of art), construction materials, munitions, toys, fuel, industrial equipment, biological materials and living goods, jewelry, books, antiques, safety items (e.g., fire extinguishers and filtration devices), carpets and other furnishings, chemicals, medical devices, paint and coatings, and windows and transparencies. Examples of credentials which may bear the composite material produced according to the present invention include drivers' licenses, identification cards (government, corporate, and educational) passports, visas, marriage certificates, hospital bracelets, and diplomas. These examples are not meant to be limiting and are only a sampling of devices that may bear the radiation diffraction material of the present invention. Such uses are not meant to be limiting.

In addition, the radiation diffraction material may be produced in the form of a film, which is then applied to an article such as via an adhesive or the like.

Alternatively, the article itself may serve as a substrate by applying the array of particles directly to the housing of the article such as the housing of electronic devices or directly to goods such as athletic equipment, accessories, optical lenses, optical frames, clothing, including shoes and the like.

The radiation diffraction material of the present invention may be used to authenticate an article, such as to authenticate a document or device or to identify the source of a manufactured product. A document, such as a security card, that bears the radiation diffraction material of the present invention would be considered to be authentic if the article bearing the radiation diffraction material exhibits the properties thereof, such as diffraction of certain wavelengths of radiation at a particular intensity level. A "security card" includes documents or devices that authenticate the identity of the bearer thereof or permit access to a facility, such as in the form of a badge. The security card may identify the bearer of the card (e.g., a photo-identification card or a passport) or may function as a document or device that indicates that the bearer thereof is to be permitted access to a secure facility. For example, a security card that appears to be authentic may be tested for having properties of diffracting radiation. A counterfeit security card would fail to exhibit that property. Likewise, consumers of an item (such as a pharmaceutical product) provided in packaging bearing an optically variable anti-counterfeiting device of the present invention can test the packaging for its authenticity by testing its diffractive properties. Packaging which does not respond appropriately would be considered to be counterfeit, while packaging that does exhibit the property would be considered to be authentic. Other consumer goods may include the radiation diffraction materials of the present invention, such as on the housing of a manufactured product (e.g., electronic devices) or on the surface of an article of clothing (e.g., shoes).

The radiation diffraction material may further be at least partially covered with a coating composition in a multi-layered structure. In one embodiment, the composite material is coated with the above-described "hard coat" coating composition. In another embodiment, the composite material is coated with an anti-reflective coating, such as in a multi-layered anti-reflective stack. The anti-reflective coating may be formed of a dielectric material; e.g., metal oxides, such as $Zn_2SnO_4$, $In_2SO_4$, $SnO_2$, $TiO_2$, $In_2O_3$, $ZnO$, $Si_3N_4$, and/or $Bi_2O_3$ deposited by sputtering.

The following examples are presented to demonstrate the general principles of the invention. The invention should not be considered as limited to the specific examples presented. All parts are by weight unless otherwise indicated.

EXAMPLES

Example 1

Infrared Diffracting Core-Shell Particles

A dispersion of polystyrene core/styrene-methyl methacrylate-ethylene glycol dimethacrylate shell particles in water was prepared via the following procedure.
Sodium bicarbonate from Aldrich Chemical Company, Inc. (2 g) was mixed with 2400 g deionized water and added to a 4-liter reaction kettle equipped with a thermocouple, heating mantle, stirrer, reflux condenser, and nitrogen inlet. The mixture was sparged with nitrogen for 25 minutes with stirring and then blanketed with nitrogen. Aerosol MA80-I (5.0 g) from Cytec Industries, Inc., and 3.0 g Brij 35 (polyoxyethylene (23) lauryl ether) from the Aldrich Chemical Company, Inc., 1.2 g sodium styrene sulfonate (SSS), and 150 g ethylene glycol, styrene monomer (500 g) all from Aldrich Chemical Company, Inc, were added to the mixture with stirring. The mixture was heated to approximately 65° C. using a heating mantle. Sodium persulfate from the Aldrich Chemical Company, Inc. (6.0 g in 200 g deionized water) was added to the mixture with stirring. Under agitation, the temperature was held at approximately 65° C. for 2.5 hours. A mixture of water (300 g), Brij 35 (3.0 g), styrene (68 g), methyl methacrylate (102 g), ethylene glycol dimethacrylate (15 g), and SSS (0.8 g), all available from Aldrich Chemical Company, Inc., was stirred for 40 minutes and then added to the reaction vessel. The temperature of the mixture was maintained at 65° C. for approximately an additional 3.5 hours. The resulting polymer dispersion was filtered through a one-micron filter bag.

The polymer dispersion was ultrafiltered using a 4-inch ultrafiltration housing with a 2.41-inch polyvinylidine fluoride membrane, both from PTI Advanced Filtration, Inc. Oxnard, Calif., and pumped using a peristaltic pump at a flow rate of approximately 170 ml per second. Deionized water (2882 g) was added to the dispersion after 2882 g of ultrafiltrate had been removed. This exchange was repeated several times until 7209 g of ultrafiltrate had been replaced with 7209 g deionized water. Additional ultrafiltrate was then removed until the solids content of the mixture was 42.6 percent by weight. The material was applied via slot-die coater from Frontier Industrial Technology, Inc., Towanda, Pa. to a 2 mil thick polyethylene terephthalate (PET) substrate and dried at 180° F. for 60 seconds to a dry thickness of approximately 10 microns. The resulting material diffracted radiation at 821 nm measured with a Cary 500 spectrophotometer from Varian, Inc.

Example 2

Visible Light Diffracting Core-Shell Particles

A dispersion of polystyrene-divinylbenzene core/styrene-methyl methacrylate-ethylene glycol dimethacrylate-divinylbenzene shell particles in water was prepared via the following procedure. 3.0 g of sodium bicarbonate from Aldrich Chemical Company, Inc., was mixed with 4100 g deionized water and added to a 12-liter reaction kettle equipped with a thermocouple, heating mantle, stirrer, reflux condenser and nitrogen inlet. The mixture was sparged with nitrogen for 40 minutes with stirring and then blanketed with nitrogen. Aerosol MA80-I (16.0 g in 410 g deionized water) from Cytec Industries, Inc., styrene monomer (416.4 g), and 8.0 g Brij 35 (polyoxyethylene (23) lauryl ether) both from the Aldrich Chemical Company, Inc. was added to the mixture with stirring followed by a 48 g deionized water rinse. The mixture was heated to approximately 50° C. for 30 minutes using a heating mantle. Then, 8.0 g polyethylene glycol methyl methacrylate from the Aldrich Chemical Company, Inc. was added to the mixture. The mixture was heated to 60° C. and then styrene monomer (940 g) was added with stirring. Sodium persulfate from the Aldrich Chemical Company, Inc. (12 g in 144 g deionized water) was added to the mixture with stirring. The temperature of the mixture was held constant for 90 minutes. Under agitation, divinylbenzene from Aldrich Chemical Company, Inc., (100 g) was added to the mixture. This was followed by an addition of 6.0 g Brij 35 in 100 g deionized water. Sodium persulfate from the Aldrich Chemical Company, Inc. (3.0 g in 900 g deionized water) was added next to the mixture with stirring. A mixture of styrene (150 g), methyl methacrylate (200 g), ethylene glycol dimethacrylate (35 g) all available from Aldrich Chemical Company, Inc., was added to the reaction mixture with stirring. Sodium styrene sulfonate (SSS) (4.5 g) was added to the reaction mixture with stirring followed by a 100 g deionized water rinse. The temperature of the mixture was maintained at 60° C. for approximately 4 hours. The resulting polymer dispersion was filtered through a five-micron filter bag. The resulting polymer dispersion was then ultrafiltered using a 4-inch ultrafiltration housing with a 2.41-inch polyvinylidine fluoride membrane, both from PTI Advanced Filtration, Inc. Oxnard, Calif. and pumped using a peristaltic pump at a flow rate of approximately 170 ml per second. Deionized water (3022 g)

was added to the dispersion after 3000 g of ultrafiltrate had been removed. This exchange was repeated several times until 7997 g of ultrafiltrate had been replaced with 7997 g deionized water. Additional ultrafiltrate was then removed until the solids content of the mixture was 44.4 percent by weight. The material was applied via slot-die coater to a two mil thick polyethylene terephthalate substrate and dried at 180° F. for one minute yielding a porous dry thickness of approximately 8 microns. The resulting material diffracted light at 494 nm.

Example 3

Organic Matrix

An ultraviolet radiation curable organic composition was prepared via the following procedure. Diphenyl (2,4,6-trimethylbenzoyl)phosphineoxide/2-hydroxy-2-methyl-propiophenone (0.2 g), 50/50 blend from Aldrich Chemical Company, Inc., was added with stirring to a mixture of 6 g ethoxylated (20) trimethylol propane triacrylate and 4 g of 1,4-butanediol diacrylate both from Sartomer Company, Inc., Exton, Pa.

Example 4

Angle Switchable Image

Two drops of the UV curable composition prepared in Example 3 were placed on the black portion of an opacity chart from The Leneta Company, Mahwah, N.J., that had been lightly scuffed-sanded with a very fine Scotch-Brite® pad (abrasive pad available from 3M Corp., Minneapolis, Minn.). The material prepared in Example 1 was placed face down on the opacity chart so that the polystyrene core/styrene-methyl methacrylate-ethylene glycol dimethacrylate shell particles rested in the deposited UV curable coating and the polyethylene terephthalate (PET) substrate was face up. An uncoated PET sheet was placed on top of the PET substrate. A roller was used on the top side of the PET sheet to spread out and force the UV curable coating from Example 3 into the interstitial spaces of the material from Example 1.

A mask with an image was placed on top of the PET substrate over the portion of the opacity chart bearing the combined materials from Example 1 and Example 3. The mask included transparent regions and opaque regions. The sample was UV radiation cured through the transparent areas of the mask using a 100 W mercury lamp. The mask and the PET substrate containing the particles were removed from the opacity chart and the sample was cleaned with isopropyl alcohol.

A film having the same design as the transparent areas of the mask was formed on the opacity chart. The resulting image had a retroreflective green color when viewed at oblique angles to the surface that appeared to switch on and off when the film was rotated in the plane of the surface. The image was virtually colorless when the viewing angle was normal to the surface, i.e., the observer viewing directly onto the plane of the surface.

Example 5

Multilayer, Composite Angle Switchable Image

The procedure of Example 4 was repeated two additional times to produce two additional film layers that were applied on top of the material from Example 4 (Image 1).

The first repeated process used material from Example 1 with a different mask resulting in a different image (Image 2). The material with Image 2 was applied on top of the film of Example 4 (Image 1), offset by 90 degrees to the orientation of the film from Example 4 (Image 1).

In the second repeated process, the material from Example 2 was embedded in the material of Example 5, following the procedures of Example 4. The resulting film was imaged with yet another mask design to produce a third layer (Image 3) that was positioned over the film of Image 2. The composite of three layers resulted in a composite image area that was copper-red color when viewed normal to the surface and a green color when viewed at an angle of 45 degrees or less to the surface (Image 3). The composite image also contained an imaged area (Image 1). This image was a retroreflective green color, when viewed at oblique angles that would appear to switch off as the composite was rotated in a plane of the composite film. When Image 1 appeared to switch off, another retroreflective green image (Image 2) would become visible. This phenomenon occurred every 30 degrees as the composite image was rotated. In essence, if Image 1 was visible then Image 2 was not visible. Likewise, if Image 2 was visible then Image 1 was not visible.

In this manner, the multilayer film exhibited colors (images) that alternated switching on and off when the film was rotated in its own plane (Image 1 and Image 2) and another color (image) that was visible when viewed at an angle to the observer.

While the preferred embodiments of the present invention are described above, obvious modifications and alterations of the present invention may be made without departing from the spirit and scope of the present invention. The scope of the present invention is defined in the appended claims and equivalents thereto.

The invention claimed is:

1. A radiation diffractive film having a viewing surface, with at least a portion of said viewing surface residing in a viewing plane, said film comprising an ordered periodic array of particles received in a matrix material, said array of particles having a crystalline structure, wherein said crystalline structure defines (i) a plurality of first crystal planes of said particles that diffract infrared radiation, said first crystal planes being parallel to said viewing surface; and (ii) a plurality of second crystal planes of said particles that diffract visible radiation, wherein upon rotation of the film about an axis normal to the viewing surface, the same wavelength of visible radiation is reflected from the second crystal planes at about 60° intervals when viewed from a constant viewing angle.

2. The film of claim 1 wherein said first crystal planes are positioned at an angle to said second crystal planes.

3. The film of claim 1 wherein the distances between said first crystal planes in said crystalline structure are greater than the distances between said second crystal planes in said crystalline structure.

4. The film of claim 3 wherein said particles are sized such that said first crystal planes diffract infrared radiation and said second crystal planes diffract visible radiation.

5. The film of claim 3 wherein said second crystal planes are at an angle to said viewing plane.

6. The film of claim 5 wherein said crystalline structure comprises a plurality of sets of second crystal planes.

7. The film of claim 6 wherein said crystalline structure comprises three sets of second crystal planes.

8. The film of claim 6 wherein at a constant vertical angle of view to said viewing plane, visible radiation is diffracted at discrete viewing perspectives of said film viewing surface.

9. The film of claim 1 further comprising another ordered periodic array of particles received in a matrix material, said other array of particles having a crystalline structure defining (i) another plurality of first crystal planes of said particles that diffract infrared radiation and (ii) another plurality of second crystal planes of said particles that diffract visible radiation.

10. The film of claim 9 wherein said second crystal planes of said two arrays diffract different wavelengths of radiation.

11. The film of claim 9 wherein said second crystal planes of said two arrays diffract radiation at different viewing perspectives of said film viewing surface.

12. The film of claim 1 wherein the particles comprise polystyrene, polyurethane, acrylic polymer, alkyd polymer, polyester, siloxane-containing polymer, polysulfide, epoxy-containing polymer, and/or polymer derived from an epoxy-containing polymer and wherein the matrix comprises a material selected from the group consisting of polyurethane, acrylic polymer, alkyd polymer, polyester, siloxane-containing polymer, polysulfide, epoxy-containing polymer, and/or polymer derived from an epoxy-containing polymer.

13. The film of claim 12 wherein the matrix further comprises an inorganic material.

14. The film of claim 1 wherein said organic polymer particles comprise a core surrounded by a shell having a composition different from said core.

15. The film of claim 14 wherein the particle cores comprise polystyrene, polyurethane, acrylic polymer, alkyd polymer, polyester, siloxane-containing polymer, polysulfide, epoxy-containing polymer, and/or polymer derived from an epoxy-containing polymer, and wherein the each of the matrix and the shell comprise polyurethane, acrylic polymer, alkyd polymer, polyester, siloxane-containing polymer, polysulfide, epoxy-containing polymer, and/or polymer derived from an epoxy-containing polymer.

16. An article comprising a substrate and a security device, said security device comprising the radiation diffractive film of claim 1.

17. The article of claim 16 wherein the article comprises a document of value, an article of manufacture, packaging for an article of manufacture, and/or a credentials document.

18. The article of claim 17 wherein the film is produced separately from the article and is applied to the article.

19. The article of claim 18 wherein the array is in particulate form for applying to the article.

20. A method of producing an anti-counterfeiting device comprising:
   producing a dispersion of mono-dispersed particles;
   applying the dispersion of particles onto a substrate so that the particles self-align into an ordered periodic array that diffracts radiation;
   coating the array of particles with a matrix composition; and
   fixing the coated array of particles to produce a film comprising a crystalline structure, wherein the particles are sized such that the crystalline structure defines (i) a plurality of first crystal planes of the particles that diffract infrared radiation, said first crystal planes being parallel to said viewing surface; and (ii) a plurality of second crystal planes of the particles that diffract visible radiation, wherein upon rotation of the film about an axis normal to the viewing surface, the same wavelength of visible radiation is reflected from the second crystal planes at about 60° intervals when viewed from a constant viewing angle.

21. The method of claim 20 wherein the particles are sized such that the distances between the first crystal planes in the crystalline structure are greater than the distances between the second crystal planes in the crystalline structure.

22. The method of claim 21 wherein the film comprises a viewing surface, with at least a portion of the viewing surface residing in a viewing plane, wherein the first crystal planes are parallel to the viewing plane and the second crystal planes are at an angle to the viewing plane.

23. The method of claim 22 further comprising:
   producing another dispersion of mono-dispersed particles;
   applying the other dispersion of particles onto a substrate so that the particles self-align into another ordered periodic array that diffracts radiation;
   coating the other array of particles with a matrix composition; and fixing the other coated array of particles to produce another film comprising another ordered periodic array of particles received in a matrix material, the other array of particles having a crystalline structure defining (i) another plurality of first crystal planes of the particles that diffract infrared radiation and (ii) another plurality of second crystal planes of the particles that diffract visible radiation; and
   stacking the films such that the second crystal planes of the two arrays are at an angle with respect to each other.

* * * * *